May 23, 1961 R. J. LAWN ET AL 2,985,665
PURIFICATION OF PHTHALIC ANHYDRIDE
Filed Oct. 3, 1956
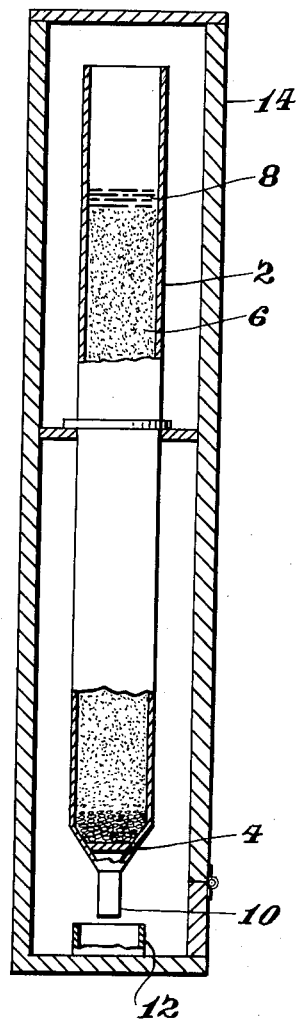
INVENTORS
Raymond J. Lawn
Craig C. Brown
BY Cushman, Darby & Cushman
ATTORNEYS

United States Patent Office 2,985,665
Patented May 23, 1961

2,985,665
PURIFICATION OF PHTHALIC ANHYDRIDE

Raymond J. Lawn and Craig C. Brown, Pittsburgh, Pa., assignors, by mesne assignments, to Pittsburgh Chemical Company, Pittsburgh, Pa., a corporation of Pennsylvania Filed Oct. 3, 1956, Ser. No. 613,676

4 Claims. (Cl. 260—346.7)

The present invention relates to the purification of phthalic anhydride to improve its color and color stability and, more particularly, to the purification of crude phthalic anhydride containing $\alpha$-naphthaquinone and related bodies which are colored or form colored compounds.

Phthalic anhydride has many uses which require it to be substantially free of color and bodies which develop color upon heating. Among such uses are the manufacture of light-colored resins, e.g., glyceryl phthalate and diallyl phthalate type resins; plasticizers, e.g., butyl decyl phthalate and dioctyl phthalate, etc.

Phthalic anhydride is conventionally prepared today by the catalytic oxidation of naphthalene vapors or ortho xylene. Crude phthalic anhydride thus obtained usually contains relatively small amounts of impurities, such as naphthaquinone, especially, $\alpha$-naphthaquinone, and other color-forming impurities. Conventionally, phthalic anhydride is purified by heating it at reflux for a considerable period of time to polymerize or otherwise decompose the impurities which would, otherwise, co-distill with the phthalic anhydride and give a colored product, or one which becomes colored upon heating. This conventional heat treatment, however, does not remove all of the undesired naphthaquinone and other color-forming bodies.

An object of the present invention is to provide a simple, efficient, and economical method for purifying crude phthalic anhydride.

Another object of the invention is to provide a simple purification treatment of crude phthalic anhydride which has been prepared by the vapor phase catalytic oxidation of naphthalene or ortho xylene whereby a purified phthalic anhydride of low color and of excellent heat color stability is obtained.

A further object of the invention is to provide an improved process for purifying crude phthalic anhydride which contains impurities of the type of $\alpha$-naphthaquinone.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has previously been proposed to remove sulfur trioxide from molten phthalic anhydride by suspending activated carbon or charcoal therein and continuing the heating until the sulfur trioxide is reduced to sulfur dioxide. The sulfur dioxide is then eliminated by venting. Due to the relatively long period of heating, resinous impurities are also formed. To separate the phthalic anhydride from these impurities, it is necessary to distill the phthalic anhydride. This is an expensive and time consuming procedure.

It has also been proposed to dissolve phthalic anhydride in an organic solvent and add decolorizing charcoal to aid in the removal of colored materials from the solution. This process has the disadvantages of requiring relatively large amounts of expensive solvents and also entails the problem of solvent recovery. The process also is not suitable for continuous operation. This process also is relatively inefficient and requires a plurality of crystallizing tanks.

Likewise, it has been suggested to absorb phthalic anhydride from a wet gas on activated carbon and later remove the phthalic anhydride from the activated carbon. This method is completely unsuited for removing small amounts of impurities from phthalic anhydride.

None of the above described processes is designed to utilize a relatively small amount of carbon per unit of phthalic anhydride purified.

It has now been found that organic color-forming impurities can be removed from phthalic anhydride by passing the molten impure phthalic through a bed of granular activated carbon. The process is essentially a continuous one and it has been found that even after a through put of 55 pounds of phthalic anhydride per pound of carbon in the bed, the carbon was still removing color. The present process is particularly effective in lowering heat color. This is particularly important in the production of plasticizers and resins which are customarily prepared at elevated temperatures, e.g., 150–250° C. The process of the present invention is also a rapid one. Generally, a flow rate of over one pound of phthalic anhydride per hour per linear foot of carbon is obtained in a column 2 inches in diameter.

The activated carbon is preferably relatively hard, having a Chemical Warfare Service hardness of between 60 and 98. A typical carbon of this type is disclosed in Patent 2,485,044.

The carbon used in the activated carbon may be obtained from various sources, e.g., petroleum coke, lignite, cocoanut, wood or a coal. Preferably, the source of the activated carbon is a bituminous coal and most preferably of the Pittsburgh seam.

When petroleum coke is employed, it is activated in an atmosphere of flue gas enriched with steam by heating to a temperature of 1500 to 2000° F. or by other suitable activating conditions known to the art.

When a coal is employed, it is heated in an oxidizing atmosphere below 600° F., devolatilized by heating in an atmosphere of steam at a temperature gradually rising to 900 to 1200° F., and finally activated in an atmosphere of steam or flue gas enriched with steam at a temperature of 1500 to 2000° F.

The particle size of the granular activated carbon is not especially critical. It can be between 4 mesh and 50 mesh (United States Sieve Series).

The process of the present invention is normally carried out above the melting point and below the boiling point of phthalic anhydride. Generally, the temperature is between 131° C. and 284° C. at atmospheric pressure. The treatment can be carried out at subatmospheric, superatmospheric or atmospheric pressure, but preferably superatmospheric pressure is employed.

In the present specification and claims, all proportions and percentages are by weight, unless otherwise indicated.

All references to numerical "color" values, e.g., "molten color" and "heat color," are according to the Platinum-Cobalt (Hazen) Color Standard described at page 71 of the 1939 edition of "Physical and Chemical Examination of Paints, Varnishes, Lacquers and Colors" by Henry A. Gardner, published by the Institute of Paint and Varnish Research, Washington, D.C.

By "molten color" is meant the color of the molten phthalic anhydride immediately after bringing the phthalic anhydride to the molten state. By "heat color" is meant the color of the molten phthalic anhydride immediately after the phthalic anhydride has been subjected to a temperature of 250° C. for one hour. The "molten" and "heat color" tests are also indicative of heat stability. The lower the color number, in general, the better is the heat stability of the phthalic anhydride.

The single figure of the drawing is a vertical section of a laboratory scale apparatus suitable for carrying out the present invention.

Referring more specifically to the drawing, there is provided a stainless steel cylindrical column 2 having a length of 24 inches and a diameter of 2 inches. The column has a stainless steel fritted retaining plate 4. The porosity of the fritted stainless steel plate is such as to permit the molten phthalic anhydride to pass through while retaining the activated carbon. The column 2 is filled to within 3 inches of the top with granular activated carbon 6, to give a carbon head of 21 inches. Molten phthalic anhydride 8 percolates through the bed of activated carbon and passes from the exit 10 into receiver 12. To maintain the phthalic anhydride molten, the entire apparatus is maintained in oven 14. Molten phthalic anhydride is intermittently introduced into the column 2 to maintain the liquid level slightly above the upper surface of the carbon.

EXAMPLE 1

To the column just described there were charged 482.5 grams of activated carbon Pittsburgh type CAL, similar to the carbon of Patent 2,485,044, but having an ash of 8.6%, 12 x 40 mesh (U.S. Standard Sieve Series) and having a C.W.S. hardness of 75–85. The carbon occupied 21 inches of the column. The stainless steel column was placed in a vertical position in the oven maintained at 300° F. (149° C.). After preheating at 300° F. for 20 minutes, the column was charged with 1,186 grams of molten phthalic anhydride to fill the column to the carbon level. The charged phthalic anhydride had a molten color of 50 and a heat color above 200. The phthalic anhydride was prepared by the $V_2O_5$ catalytic oxidation of naphthalene. The column was charged intermittently with molten phthalic anhydride to keep a slight head on the column. The effluent phthalic anhydride was caught in the beaker, cooled and later tested for molten and heat color. The results obtained in this example are summarized in Table I. The time 0 is the point where the column was filled with the initial 1186 grams of phthalic anhydride.

Table I

| Time, min. | Phthalic Anhydride Thru-Put | | Molten Color (Hazen) | Heat Color (Hazen) |
|---|---|---|---|---|
| | gms. | lbs. | | |
| 0 | None | None | 50 (Original) | 200+ (Original) |
| 30 | 563 | 1.24 | 40 | 150–200 |
| 50 | 920 | 2.02 | 20 | 60 |
| 230 | 2,902 | 6.40 | 10 | 60 |
| 340 | 4,650 | 10.24 | 10 | 50 |
| 475 | 6,684 | 14.70 | 20 | 50 |
| 735 | 9,206 | 20.22 | 20 | 50 |
| 765 | 9,829 | 21.61 | 20 | 50 |
| 960 | 14,249 | 31.5 | 20 | 50 |
| 1,105 | 16,430 | 36.2 | 20 | 50 |
| 1,340 | 19,329 | 43.6 | 30 | 60 |
| 1,510 | 22,432 | 49.5 | 30 | 80 |
| 1,645 | 23,844 | 52.5 | 30 | 80 |
| 1,735 | 25,141 | 55.4 | 30 | 60 |
| 1,840 | 26,319 | 57.9 | 30 | 70 |
| 1,870 (31 hrs., 10 min.) | 26,650 | 58.7 | 30 | 60 |

Total weight P.A. to fill column to carbon level at start=1186 gms.
Total weight carbon in column at start of run=482.5 gms.
Total weight carbon+P.A. retained in column at end of run=1303 gms.
Flow rate, lbs. P.A./hr./linear foot of carbon=1.1.

EXAMPLE 2

To the column described in Example 1 there were charged 474 grams of activated carbon Pittsburgh type OL having a 20 x 40 mesh (U.S. Standard Sieve Series) and an ash of 7.6%. The stainless steel column and carbon were preheated for one hour in an oven maintained at 300° F. The column was charged with molten phthalic anhydride to above the carbon level. The charged phthalic anhydride had a molten color of 60 Hazen and a heat color of 250 Hazen. The phthalic anhydride was prepared by the $V_2O_5$ catalytic oxidation of naphthalene. The column was charged intermittently with the molten phthalic anhydride to maintain a slight head on the column. The effluent phthalic anhydride was received in the beaker, cooled and later tested for molten and heat color. The results obtained in this example are summarized in Table II. The time 0 is the point where the column was filled with the initial charge of phthalic anhydride.

Table II

| Time, min. | Phthalic Anhydride Thru-Put, grams | Molten Color (Hazen) | Heat Color (Hazen) |
|---|---|---|---|
| 0 | None | 60 (Original) | 250 (Original) |
| 70 | 1,273 | 40 | 140 |
| 165 | 2,272 | 40 | 110 |
| 355 | 5,761 | 35 | 100 |
| 410 | 7,531 | 35 | 110 |
| 720 | 13,736 | 30 | 100 |
| 891 | 17,048 | 30 | 100 |
| 1,281 | 21,656 | 30 | 90 |
| 1,521 | 22,819 | 30 | 100 |

EXAMPLE 3

To the column described under Example 1 there were charged 500 grams of activated carbon Columbia's Grade SXAC, 6 to 8 mesh (U.S. Standard Sieve Series) and an ash of 1.26%. The column and carbon were preheated for 30 minutes at 300° F. ±5° F. The column was then charged with molten phthalic anhydride to slightly above the carbon level. The charged phthalic anhydride had a molten color of 60 Hazen and a heat color of 250 Hazen. The phthalic anhydride was prepared by the $V_2O_5$ catalytic oxidation of naphthalene. The column was intermittently recharged with molten phthalic anhydride to keep a slight head above the carbon in the column. The effluent phthalic anhydride was received and tested as described under Example 1. The results obtained are summarized in Table III. The time 0 is the point where the column was filled with the initial charge of phthalic anhydride.

Table III

| Time, min. | Phthalic Anhydride Thru Put, grams | Molten Color (Hazen) | Heat Color (Hazen) |
|---|---|---|---|
| 0 | None | 60 (Original) | 250 (Original) |
| 60 | 1,322 | 60 | 140 |
| 180 | 3,326 | 40 | 120 |
| 375 | 6,911 | 40 | 130 |

EXAMPLE 4

To the column described in Example 1 there were charged 480 grams of activated carbon Pittsburgh type SGL, described in Zabor Patent No. 2,763,580, having a mesh size of 6 x 30 (U.S. Standard Sieve Series) and an ash of about 7.0%. The column and carbon were preheated for one hour at 300° F.; the column was charged with molten phthalic anhydride to slightly above the carbon level. The charged phthalic anhydride had a molten color of 30 Hazen and a heat color of 60 Hazen. The phthalic anhydride was prepared by the catalytic air oxidation of ortho xylene. The column was charged intermittently with molten phthalic anhydride to keep a slight head on the column. The effluent phthalic anhydride was caught and tested in the same manner as described in Example 1. The results obtained in this example are summarized in Table IV.

Table IV

| Time, min. | Phthalic Anhydride Thru Put, grams | Molten Color (Hazen) | Heat Color (Hazen) |
|---|---|---|---|
| 0 | None | 30 (Original) | 60 (Original) |
| 58 | 1,348 | 20 | 60 |
| 108 | 2,701 | 20 | 50 |
| 538 | 8,391 | 20 | 50 |

EXAMPLE 5

To the column described in Example 1, there were charged 440 grams of Darco activated carbon having a mesh size of 20 x 40 (U.S. Standard Sieve Series) and an ash of 19%. The column and carbon were preheated for one hour at 300° F.; the column was charged with molten phthalic anhydride to slightly above the carbon level. The charged phthalic anhydride had a molten color of 80 to 90 Hazen and a heat color of 250 Hazen. The phthalic anhydride was prepared by the $V_2O_5$ catalytic oxidation of naphthalene. The column was intermittently recharged with molten phthalic anhydride to keep a slight head above the carbon in the column. The effluent phthalic anhydride was received and tested as described under Example 1. The results obtained are summarized in Table V. The time 0 is the point where the column was filled with the initial charge of phthalic anhydride.

Table V

| Time, min. | Phthalic Anhydride Thru Put, grams | Molten Color (Hazen) | Heat Color (Hazen) |
|---|---|---|---|
| 0 | None | 80-90 (Original) | 250 (Original) |
| 90 | 671 | 130-140 | 250 |
| 290 | 2,352 | 60 | 120 |
| 625 | 5,224 | 50 | 120 |
| 1,035 | 9,152 | 40 | 100 |
| 1,445 | 13,248 | 40 | 100 |

From Example 1, it will be noted that the original molten color of 50 was reduced to a low of 10, high of 30, and average of about 20, while the original heat color of more than 200 was reduced to a low of 50, high of 85, and an average of about 65. The results obtained are outstanding when it is considered that present day specifications permit a maximum heat color of 150. The material reduction in heat color obtained by the present process consequently means improved products over those which merely meet today's standards.

The present process also is essentially a rapid, continuous one with attendant advantages over relatively slow batch processes.

We claim:
1. A process for the purification of crude phthalic anhydride prepared by the catalytic oxidation of a member of the group consisting of naphthalene and ortho xylene containing small amounts of organic color-forming impurities which comprises passing the crude phthalic anhydride in molten form through a bed of granular activated carbon.
2. A process according to claim 1 wherein the phthalic anhydride is passed downwardly through the bed of activated carbon and the crude phthalic anhydride is prepared by the catalytic oxidation of naphthalene.
3. A process according to claim 2 wherein the activated carbon has a Chemical Warfare Service hardness of 60-98.
4. A process according to claim 3 wherein the molten phthalic anhydride is passed through the bed of activated carbon until at least 55 pounds of phthalic anhydride have passed through per pound of activated carbon in the bed.

References Cited in the file of this patent

UNITED STATES PATENTS

| 1,301,388 | Conover et al. | Apr. 22, 1919 |
| 1,693,915 | Brode | Dec. 4, 1928 |
| 1,898,688 | Rose | Feb. 21, 1933 |
| 2,118,918 | Foster et al. | May 31, 1938 |
| 2,275,660 | Steinle | Mar. 10, 1942 |
| 2,518,312 | Hartig | Aug. 8, 1950 |